UNITED STATES PATENT OFFICE.

CORNELIUS KIMPLEN, OF CHICAGO, ILLINOIS.

PROCESS OF UTILIZING COAL-DUST.

SPECIFICATION forming part of Letters Patent No. 392,868, dated November 13, 1888.

Application filed October 22, 1887. Serial No. 253,122. (No specimens.)

*To all whom it may concern:*

Be it known that I, CORNELIUS KIMPLEN, residing at Chicago, in the county of Cook and State of Illinois, and a citizen of the United States, have invented a new and useful Improved Process or Method of Utilizing Coal Dust or Screenings, of which the following is a specification.

The object of this invention is to utilize coal dust or screenings which have heretofore been practically waste material by treating such material in the manner and for the purposes hereinafter described; and its nature consists in the process or method hereinafter described and claimed as new.

In the treatment of what is usually called "coal-screenings" or "coal-dust" I first take clay (potter's clay being preferred) and mix with water until the mixture is about the consistency of cream. I then thoroughly mix the screenings or dust with this cream of clay until the particles coat, and then by the use of a moderate heat dry the screenings so coated with clay. When dry, I mix with the clay-coated coal dust or screenings finely-pulverized rosin, sometimes known as "flour of rosin," in the proportion of about one per cent.; but more or somewhat less may be used. I then apply or add a small amount of water and heat the mixture up in suitable vessels to about 212° Fahrenheit, and when the mass is uniformly heated, or in a proper condition and while hot, the mixture is placed in suitable molds and subjected to hydraulic or heavy pressure. The molds may vary in size and shape to suit the size and form of blocks or cakes desired, and any suitable press may be used. It will, however, be advantageous to prepare a press especially adapted to this work.

I have found by practical experience and use that blocks or cakes formed in this manner adhere together under the effects of either heat or moisture and burn with the regularity of blocks of natural coal of equal size.

The foregoing process is mainly designed for utilizing the dust and screenings of anthracite coal; but it will be found advantageous for other coals.

I am aware that it has been proposed to make an artificial fuel from a mixture of coal-dust and clay formed into lumps which are to be dipped into pitch, tar, asphaltum, rosin, or other waterproofing material. A mixture of coal-dust and clay formed into lumps that are to be immersed in a liquid composed of rosin dissolved in benzine and afterward exposed to heat to evaporate the volatile portion of the coating-liquid has been proposed for fuel. Coal-dust mixed with clay and turpentine without heat and molding has also been suggested as fuel. These, however, I do not claim; and my invention is distinguished therefrom in requiring the employment of comparatively a small quantity of clay, which, when mixed with water, is applied as a coating to the coal-dust; and the clay-coated coal-dust, after drying, is thoroughly mixed with finely-pulverized rosin and molded while hot, thus securing a more intimate mixture of the coal-dust and rosin with greater cohesion of the particles, so that the molded block or lump of artificial fuel will maintain its integrity until consumed.

What I claim as new, and desire to secure by Letters Patent, is—

The herein-described process of forming coal dust or screenings into blocks or cakes for fuel, which consists in first coating the particles of coal dust or screenings with a mixture of clay and water, then drying the clay-coated coal dust or screenings, then mixing them with finely-pulverized rosin, and then heating the mass and molding it under pressure while hot, substantially as described.

CORNELIUS KIMPLEN.

Witnesses:
ALBERT H. ADAMS,
L. L. BOND.